(12) United States Patent
Cifyildiz et al.

(10) Patent No.: US 9,130,432 B2
(45) Date of Patent: Sep. 8, 2015

(54) ROTATING ELECTRICAL MACHINE

(75) Inventors: Serdar Cifyildiz, Winterthur (CH);
Alexander Schwery, Küttigen (CH);
Ricardo Naoki Okai, Fislisbach (CH);
Hanspeter Walser, Laupersdorf (CH);
Matthias Schmid, Birmenstorf (CH)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 438 days.

(21) Appl. No.: 13/569,259

(22) Filed: Aug. 8, 2012

(65) Prior Publication Data

US 2013/0038166 A1 Feb. 14, 2013

(30) Foreign Application Priority Data

Aug. 11, 2011 (DE) .......................... 10 2011 109 953

(51) Int. Cl.
*H02K 3/51* (2006.01)
(52) U.S. Cl.
CPC ....................................... *H02K 3/51* (2013.01)
(58) Field of Classification Search
CPC .............. H02K 1/28; H02K 3/50; H02K 3/51
USPC ........................................................ 310/270
See application file for complete search history.

(56) References Cited

U.S. PATENT DOCUMENTS

| | | | | |
|---|---|---|---|---|
| 5,635,785 A | * | 6/1997 | Schwanda et al. | 310/270 |
| 2010/0079030 A1 | * | 4/2010 | Schwery et al. | 310/270 |
| 2012/0068569 A1 | | 3/2012 | Henning et al. | |

FOREIGN PATENT DOCUMENTS

| | | |
|---|---|---|
| DE | 19513457 A1 | 10/1996 |
| JP | A-9-308165 | 11/1997 |
| JP | A-2011-24331 | 2/2011 |
| WO | 2010115481 A1 | 10/2010 |

OTHER PUBLICATIONS

Oct. 20, 2014 Japanese Office Action issued in Japanese Application No. 2012-177765.

* cited by examiner

*Primary Examiner* — Burton Mullins
(74) *Attorney, Agent, or Firm* — Buchanan Ingersoll & Rooney PC

(57) ABSTRACT

A rotating electric machine includes a rotor, having a rotor laminate stack extending in the direction of a machine axis and having a rotor winding, the rotor winding forming a winding head at each of the ends of the rotor laminate stack, said winding head being fastened to a winding head rim, which is arranged concentrically within the winding head and adjoins the rotor laminate stack in the axial direction, in order to intercept centrifugal forces by means of bolts passing radially through the winding head, and a fastening designed to safely absorb axial expansions of the winding head. Simple and secure fastening is achieved by virtue of the bolts being fastened to the winding head rim in each case on a T-shaped hammer profile, which extends in the axial direction and is mounted in axially movable fashion in an associated axial T-shaped slot in the winding head rim.

4 Claims, 2 Drawing Sheets

ROTATING ELECTRICAL MACHINE

CROSS REFERENCES TO RELATED APPLICATIONS

This application claims benefit under 35 U.S.C. 119 to German Patent Application No. 10 2011 109 953.4, filed Aug. 11, 2011, the entire contents of which are incorporated herein by reference as if fully set forth.

FIELD OF THE INVENTION

The present invention relates to the field of electric machines. It relates to a rotating electric machine, in particular a hydrogenerator.

BACKGROUND

The invention relates to a rotor of an electric machine, in particular a hydrogenerator, as is used in pumped storage plants, for example, with a rotor body which is constructed from laminated metal sheets and is held together by axial clamping bolts. Axial winding slots are arranged over the outer circumference of the rotor body, with a rotor winding being inserted into said winding slots and held therein counter to the action of centrifugal forces. The winding bars emerging axially from the rotor body and forming a winding head are protected from the effects of centrifugal forces by special supporting means.

In such machines, the winding head on the rotor is subject to extreme mechanical and thermal loads. The support of the winding head with respect to centrifugal forces can in this case take place by means of banding consisting of prestressed steel wire in combination with a solid integral steel ring. The complex fitting assists, however, the transportation dimensions and the weight limitation of the rotor result in limitations. For rotors of hydraulic prime movers with large dimensions, it needs to be possible to perform the assembly directly at an installation position in the power station. Furthermore, large solid steel rings impair the flow through the winding head and therefore cooling of said winding head.

Document DE 195 13 457 discloses arranging press fingers on the end laminations of the rotor body and providing a supporting ring comprising at least two rings which are spaced apart from one another in the axial direction and which are supported at their inner circumference on the hub, the rings being clamped together, in that section of the rotor body which is close to the axis, together with the press fingers with the first tie bolt which passes axially through the rotor body. In the section which is further from the axis, second tie bolts are provided, which pass axially through only said rings and clamp the rings together axially. Finally, third tie bolts are provided which pass radially through the winding head and act at least on the outer circumference of the outermost, when viewed axially, ring.

A large number of axially running, mutually aligned, half-closed slots are provided distributed in the circumferential direction over the outer circumference of all of the rings, into which in each case one straight edge provided with radially running threaded bores is inserted, with said third tie bolts being screwed into said threaded bores. This provides secure radial support which can be easily produced.

However, in this known arrangement, the axial thermal expansion of the winding on heating can result in the winding pressing onto the winding head bolts (the third bolts) and said bolts experiencing undesired and intolerable bending.

Document WO 2010/115481 proposes, for avoiding these problems, a dynamoelectric machine with a rotor body, a ring-shaped winding head, which is arranged axially next to the rotor body and coaxially with respect thereto, and a supporting ring, which is arranged radially within the winding head and coaxially with respect thereto, the winding head and supporting ring being connected to the rotor body in rotationally fixed fashion and the winding head and the supporting ring being clamped to one another in the radial direction by tension rods, which are passed through radial bores in the winding heads and in the supporting ring. The tension rods in this case act with their radially inner ends on the supporting ring and with their radially outer ends on the bearing blocks, which bear against the winding head. The clear widths of radial bores in the supporting body have an excess dimension in comparison with the diameters of the tension rods, and the bearing arrangement of the radially inner ends of the tension rods on the supporting ring and the radially outer ends of the tension rods on the winding head enables a limited tilting movement of the tension rods towards the radial direction. This is achieved in particular in that at least some of the ends of the tension rods are mounted by means of bearing blocks, which have a spherical bearing surface.

However, one disadvantage with this solution is that all of the tension rods need to be prepared individually for a tilting movement, which results in considerable design and fitting complexity.

SUMMARY

The present disclosure is directed to a rotating electric machine including a rotor, which includes a rotor laminate stack extending in a machine axis direction and having a rotor winding. The rotor winding forms a winding head at each end of the rotor laminate stack, said winding head being fastened to a winding head rim, which is arranged concentrically within the winding head and adjoins the rotor laminate stack in an axial direction, in order to intercept centrifugal forces by means of bolts radially passing through the winding head, and a fastening being designed to safely absorb axial expansions of the winding head, the bolts are fastened to the winding head rim on a T-shaped hammer profile, which extends in the axial direction and is mounted in axially movable fashion in an associated axial T shaped slot in the winding head rim.

BRIEF DESCRIPTION OF THE DRAWINGS

The invention will be explained in more detail below with reference to exemplary embodiments in connection with the drawing, in which.

DETAILED DESCRIPTION OF THE PREFERRED EMBODIMENTS

Introduction to the Embodiments

One object of the invention is therefore to provide a rotating electric machine of the type mentioned at the outset which avoids the disadvantages of the known machines as regards the protection of the winding heads against centrifugal forces by neutralization, which is effective and simple in design terms, of the thermal expansion of the winding heads.

The object is achieved by the totality of the features.

The invention relates to a rotating electric machine, in particular a hydrogenerator, comprising a rotor, which comprises a rotor laminate stack extending in the direction of a machine axis and having a rotor winding, the rotor winding forming a winding head at each of the ends of the rotor laminate stack, said winding head being fastened to a winding head rim, which is arranged concentrically within the winding head and adjoins the rotor laminate stack in the axial direction, in order to intercept centrifugal forces by means of bolts passing radially through the winding head, and the fastening being designed to safely absorb axial expansions of the winding head. The bolts are fastened to the winding head rim in each case on a T-shaped hammer profile, which extends in the axial direction and is mounted in axially movable fashion in an associated axial T-shaped slot in the winding head rim.

According to one configuration, the bolts are in the form of screw bolts and are screwed into the T-shaped hammer profile.

In another configuration, a plurality of bolts with the same radial alignment are arranged one behind the other in the axial direction, and that all of the bolts with the same radial alignment are fastened on a common T-shaped hammer profile or screwed into a common T-shaped hammer profile.

In particular, all of the bolts with the same radial alignment act on the winding head from the outside via a common holding element.

DETAILED DESCRIPTION

Figure 1:
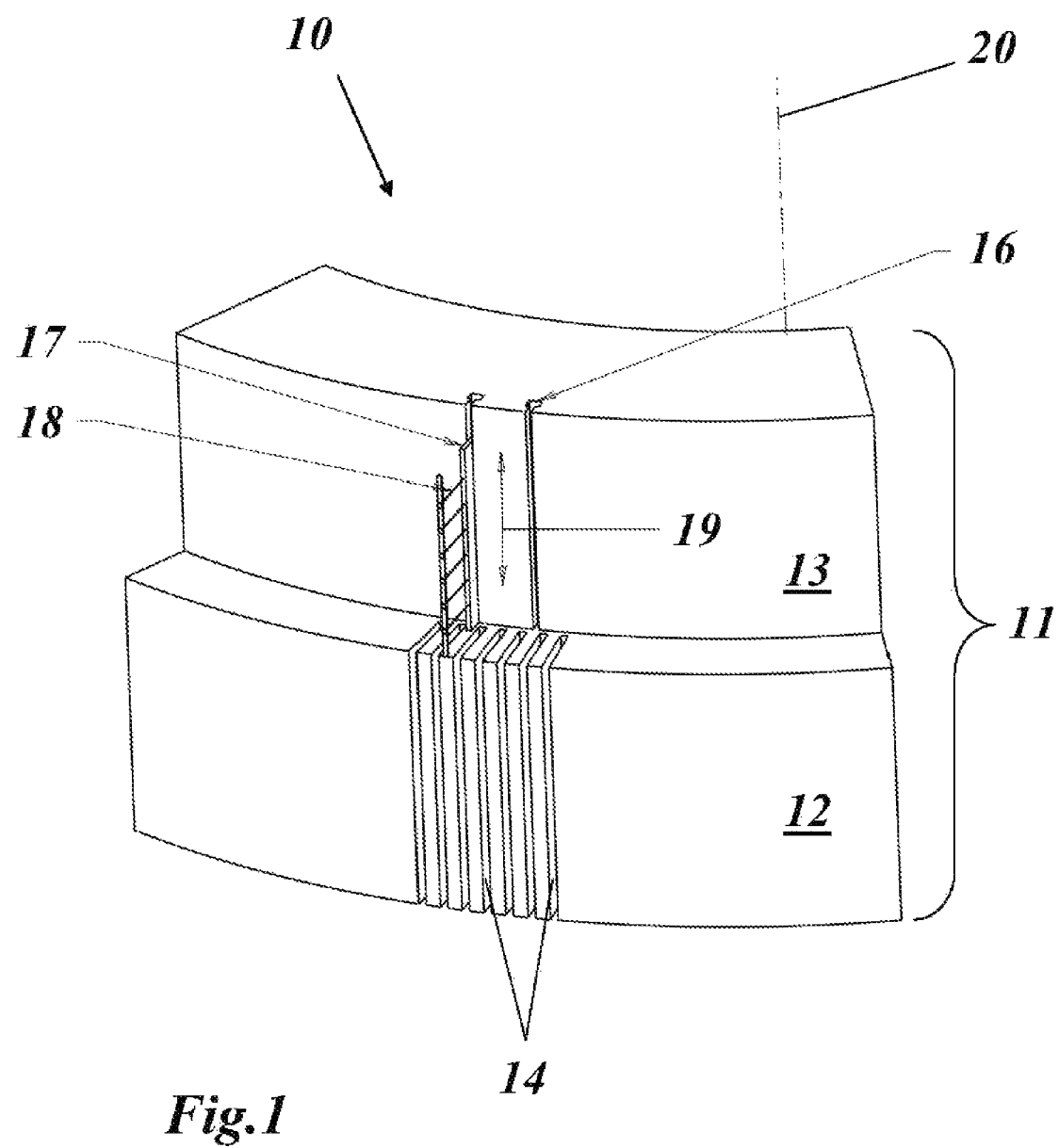
FIG. 1 shows a perspective side view of a detail of a rotor of a rotating electric machine in accordance with one exemplary embodiment of the invention.

FIG. 1 shows a perspective side view of a detail of a rotor of a rotating electric machine 10 in accordance with one exemplary embodiment of the invention. The rotor 11, of which only a section can be seen, extends along a machine axis 20 and comprises a rotor body or a rotor laminate stack 12, with a winding head rim 13 adjoining said rotor laminate stack at the illustrated end.

Figures 2A, 2B:
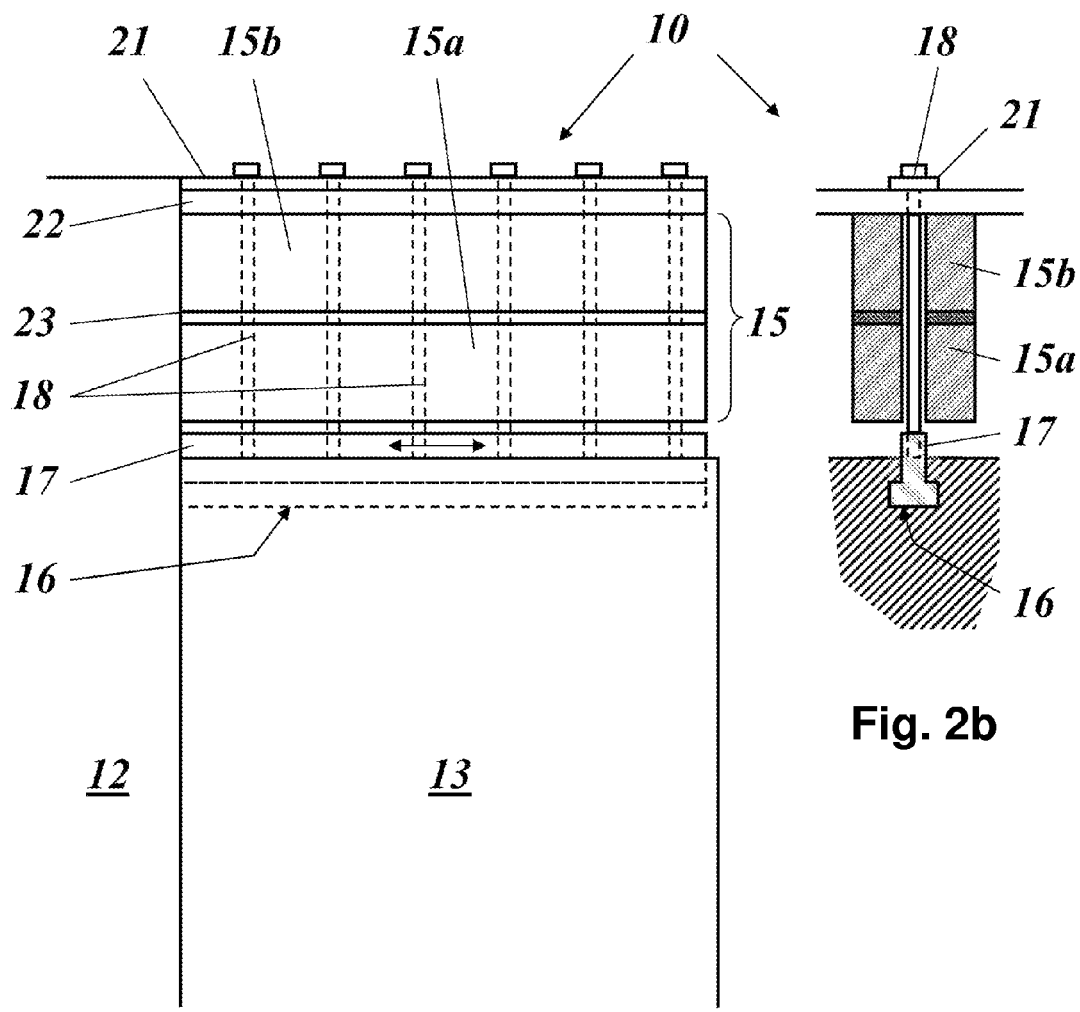
FIGS. 2a-2b shows the arrangement and fastening of the winding head in the machine shown in FIG. 1 in a view transverse to the machine axis (FIG. 2a) and in a view in the axial direction (FIG. 2b).

Axial winding slots which accommodate the rotor winding (not illustrated) are arranged on the outer circumference of the rotor laminate stack 12. The exposed winding bars (15a, b in FIGS. 2a, 2b) emerging from the rotor laminate stack 12 form a winding head (15 in FIG. 2a), which needs to be supported with respect to the centrifugal forces occurring during operation of the machine.

For this purpose, radially oriented bolts 18 are provided in the region of the winding head 15, said bolts reaching through the winding head 15 and being fastened to the winding head rim 13. In order to enable free axial expansion of the winding head 15 and fastening thereof, the entire winding head fastening needs to compensate for the thermal expansions of the winding. In the proposed solution, this is achieved by virtue of the fact that the winding head fastening can move in the axial direction. For each axial series of bolts 18 with the same radial alignment, in each case one common axially extending T-shaped hammer profile 17 is provided, on which the bolts 18 for the winding head 15 are fastened. The T-shaped hammer profile 17 is provided with correspondingly spaced-apart threaded holes for this purpose, with the bolts 18 in the form of threaded bolts being screwed with their inner ends into said threaded holes. The T-shaped hammer profiles 17 are guided axially in axially oriented, matching T-shaped slots 16 in the winding head rim 13. The bolts 18 are supported with their head on a common, axially extending holding element 21 on the outer side, and said holding element exerts radial pressure on the winding head 15 via a base layer 22, for example. Interlayers 23 can be arranged between the winding bars 15a and 15b in order to introduce the forces occurring uniformly into the winding head 15.

Owing to the described design of the winding head 15 and its fastening on the winding head rim 13, firstly, the centrifugal forces occurring during operation on the winding head 15 are intercepted and introduced into the winding head rim 13 and secondly, the thermal expansion of the winding does not result in the buildup of any shear forces at the bolts 18, because said bolts can collectively with the entire fastening relative to the winding head rim 13 in the axial movement direction 19 illustrated in FIG. 1 by virtue of the T-shaped hammer profile 17 sliding in the T-shaped slot 16 in the axial direction.

LIST OF REFERENCE SYMBOLS 10 rotating electric machine (in particular hydrogenerator)
11 rotor
12 rotor laminate stack
13 winding head rim
14 winding slot
15 winding head
15a, b winding bar
16 T-shaped slot
17 T-shaped hammer profile
18 bolts
19 movement direction
20 machine axis
21 holding element
22 base layer
23 interlayer

What is claimed is:

1. A rotating electric machine comprising a rotor, which comprises a rotor laminate stack extending in a machine axis direction and having a rotor winding, the rotor winding forming a winding head at each end of the rotor laminate stack, said winding head being fastened to a winding head rim, which is arranged concentrically within the winding head and adjoins the rotor laminate stack in an axial direction, in order to intercept centrifugal forces by bolts radially passing through the winding head, and a fastening of the winding head to the winding head rim being designed to safely absorb axial expansions of the winding head, the bolts are fastened to the winding head rim on a T-shaped hammer profile, which extends in the axial direction and is mounted in an axially movable fashion in an associated axial T-shaped slot in the winding head rim,
wherein a plurality of bolts with the same radial alignment are arranged one behind the other in the axial direction, and all of the bolts with the same radial alignment are fastened on a common T-shaped hammer profile or screwed into a common T-shaped hammer profile.

2. The rotating electric machine as claimed in claim 1, wherein the bolts are in the form of screw bolts and are screwed into the T-shaped hammer profile.

3. The rotating electric machine as claimed in claim 1, wherein all of the bolts with the same radial alignment externally act on the winding head via a common holding element.

4. The rotating electric machine as claimed in claim 1, wherein the rotating electric machine is a hydrogenerator.

* * * * *